US012771710B2

(12) United States Patent
Jaganathan et al.

(10) Patent No.: US 12,771,710 B2
(45) Date of Patent: Oct. 20, 2026

(54) THREAT NOTIFICATIONS AND REMEDIES FOR HOME NETWORKS

(71) Applicant: QUALCOMM Incorporated, San Diego, CA (US)

(72) Inventors: Jayaprahas Jaganathan, Chennai (IN); Balakrishnan Kandasamy, Namakkal (IN); Vadivel Pichaimani, Chennai (IN)

(73) Assignee: QUALCOMM Incorporated, San Diego, CA (US)

( * ) Notice: Subject to any disclaimer, the term of this patent is extended or adjusted under 35 U.S.C. 154(b) by 309 days.

(21) Appl. No.: 18/461,006

(22) Filed: Sep. 5, 2023

(65) Prior Publication Data

US 2025/0080571 A1 Mar. 6, 2025

(51) Int. Cl.
*H04L 9/40* (2022.01)

(52) U.S. Cl.
CPC ...... *H04L 63/1441* (2013.01); *H04L 63/1416* (2013.01); *H04L 63/20* (2013.01)

(58) Field of Classification Search
CPC .. H04L 63/1441; H04L 63/1416; H04L 63/20
USPC .............................................................. 726/1
See application file for complete search history.

(56) References Cited

U.S. PATENT DOCUMENTS 9,325,735 B1 * 4/2016 Xie ..................... H04L 63/1425
2009/0241196 A1 * 9/2009 Troyansky .......... H04L 63/1491 726/25
2012/0110671 A1 * 5/2012 Beresnevichiene ....... G06F 8/10 726/25
2015/0013006 A1 * 1/2015 Shulman ............. H04L 63/1416 726/23
2015/0047032 A1 2/2015 Hannis et al.
2015/0067816 A1 * 3/2015 Rados ..................... H04L 63/20 726/11

(Continued)

FOREIGN PATENT DOCUMENTS

WO 2007061167 A1 5/2007

OTHER PUBLICATIONS

International Search Report and Written Opinion—PCT/US2024/038081—ISA/EPO—Oct. 25, 2024.

*Primary Examiner* — Teshome Hailu
(74) *Attorney, Agent, or Firm* — AVEK IP, LLC (QUALCOMM)

(57) ABSTRACT

This disclosure provides methods, components, devices, and systems for network security and for providing threat notifications in association with threat detections. Some aspects relate to notifications for network security threats detected by a gateway of a network. The gateway may monitor network traffic on the gateway and detect threats using packet inspection, traffic logging, content filtering, and other tools. Upon identification, determination, or detection of a potential threat, a security response mechanism may be implemented that may include providing a notification to a device on the network, to a user on the network, or both. The notification may include one or more of a visual indication, an audible indication, a tactile indication, and an electronic message. The gateway may output the notification to a group of devices based on the predefined preference of each device. The notification may include mitigation procedures usable to mitigate damage associated with the security threat.

30 Claims, 9 Drawing Sheets

(56) References Cited

U.S. PATENT DOCUMENTS

| | | | | |
|---|---|---|---|---|
| 2016/0232349 | A1* | 8/2016 | Baeder | G06F 21/554 |
| 2016/0285904 | A1 | 9/2016 | Ye et al. | |
| 2016/0330233 | A1* | 11/2016 | Hart | H04L 63/20 |
| 2017/0244749 | A1* | 8/2017 | Shulman | H04L 63/1441 |
| 2017/0264636 | A1* | 9/2017 | Istomin | H04L 63/1441 |
| 2023/0336573 | A1* | 10/2023 | Jones | H04L 63/1416 |

* cited by examiner

THREAT NOTIFICATIONS AND REMEDIES FOR HOME NETWORKS

TECHNICAL FIELD

This disclosure relates generally to wireless communication, and more specifically, to intrusion notification for home networks.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

To improve data throughput, the AP may communicate with one or more STAs over multiple concurrent communication links. Each of the communication links may be of various bandwidths, for example, a number of 20 MHz-wide channels may be bonded together to form 40 MHz-wide channels, 80 MHZ-wide channels, or 160 MHZ-wide channels. The AP may establish BSSs on any of the different communication links, and therefore, it may be desirable to improve communication between the AP and the one or more STAs over each of the communication links.

In a home network scenario, an unknown (such as an unscrupulous) entity may attempt to enter the network. For example, the unknown entity may attempt to enter the network repeatedly over a period of time. Even if the home router denies the unknown entity entry through authentication, the administrator or user of the home router may not be notified of this attack. If somehow the intruder manages to crack the password and get access to the home router, the actual user/administrator of the home router may remain unaware of the incursion. In the above scenario, if the user/administrator of the network gets notified of these attacks in some manner, then the breach may be avoided (such as by changing the SSID/Password of the router and blocking the device). Existing quantum-dot cellular automata (QCA) routers are capable of blocking the various security attacks such as a distributed denial-of-service (DDOS) attack, an address resolution protocol (ARP) attack, an internet control message protocol (ICMP) attack, a transmission control protocol (TCP) attack, a user datagram protocol (UDP) volumetric DOS attack, an internet protocol (IP) spoofing attack, and a synchronization packet flood (SYNC) attack, for example. The user is completely ignorant of these attacks and will face security threats if the attacker takes over the network. If the user is aware of a network attack, precautionary actions may be taken.

If an attacker gains access to a computer network, the attacker may be able to steal sensitive data such as financial information and personal data. This can lead to financial loss and reputational damage for individuals and organizations. An attacker may introduce malware such as viruses, worms, or ransomware into the network, which can spread and infect other devices on the network, leading to data loss, system downtime, and financial loss. An attacker may gain access to other devices and systems on the network, allowing the attacker to modify, delete, or steal data or perform malicious activities.

Another consequence of a network attack may be an extremely poor network experience. The user may not be aware that the subpar network experience is associated with a network attack. During a network attack, the gateway needs to handle both the unintended and intended data traffic, which overtaxes the gateway processor and as a result impacts the device and network performance. The user must investigate the logs to understand the reason behind the poor network performance, which is a time consuming process beyond the technical knowledge of most users.

If the user is notified of a network attack, immediate action can be taken to stop the network intrusion. However, current routers are not interactive and various network security information regarding the specifics of any network attack is not conveyed to the user.

SUMMARY

The systems, methods and devices of this disclosure each have several innovative aspects, no single one of which is solely responsible for the desirable attributes disclosed herein.

One innovative aspect of the subject matter described in this disclosure can be implemented in a gateway device including a processing system. The processing system includes processor circuitry and memory circuitry that stores code. The processing system is configured to cause the gateway to monitor network traffic of a network on the gateway and receive a notification that the network traffic indicates a security threat to the network. The processing system is configured to initiate a security response associated with a security policy. The processing system is configured to output the notification associated with the security response to a device.

In some examples, the notification includes a description of the security threat and a mitigation procedure associated with the security threat.

In some examples, the security response causes the gateway to emit a visual indication, an audio indication, or both. Another innovative aspect of the subject matter described in this disclosure can be implemented in a gateway device that includes a processing system. The processing system has one or more processors and one or more memories coupled with the one or more processors. The processing system is configured to cause the gateway to monitor network traffic of a network on the gateway, receive a notification that the network traffic indicates a security threat to the network, initiate a security response associated with a security policy, and output the notification associated with the security response to a device.

Another innovative aspect of the subject matter described in this disclosure can be implemented in a method of gateway operation. The method includes monitoring network traffic of a network on the gateway and receiving a notification that the network traffic indicates a security threat to the network. The method also includes initiating a security response associated with a security policy and outputting the notification associated with the security response to a device.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
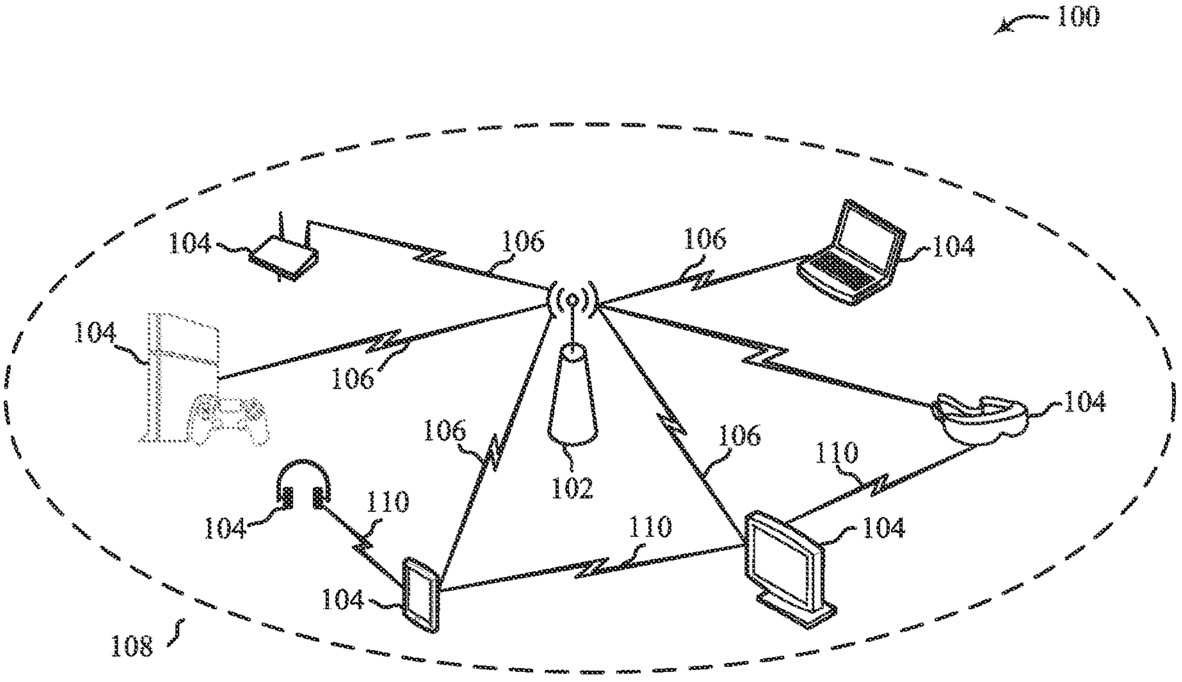
FIG. 1 shows a pictorial diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system, or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO), and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IoT) network.

Various aspects relate to network security and to threat notifications in response to threat detections. Some aspects relate to notifications for network security threats detected by a gateway, or a gateway agent, of a network. A gateway device, or gateway agent, may use a variety of tools for threat detection and threat mitigation including packet inspection, traffic logging, and content filtering. Upon identification, determination or detection of a potential threat, a security response mechanism can be implemented that may include providing a notification to a device on the network, to a user on the network, or both. For example, the gateway device can be configured to output a notification to a group of devices. In some implementations, the group of devices can be predefined, and also can have predefined notification preferences. Such devices can include one or more: home gateways, routers, network components, display devices, wearables, televisions, smartphones, network-attached speakers, in addition to other types of devices. In some examples, the notification also can include mitigation procedures that a user can take to prevent further activity that the security threat may cause.

Particular aspects of the subject matter described in this disclosure can be implemented to realize one or more of the following potential advantages. By providing devices, or users, with rapid notifications when a security threat is detected by a gateway of a network may enable devices, or users, to engage in potential mitigation procedures before a security threat increases in intensity. Additionally, by providing devices, or users, with an opportunity to quickly mitigate potential security threats may result in reducing, or otherwise avoiding, network downtime that may occur as a result of the security threat breaching the network causing the network to go offline. By providing various types of notifications, the devices, or users, may understand the potential risks posed to their network and may enable such devices, or users, to take action to improve network security. Such aspects may improve the response time of security threat mitigation techniques which may prevent potential data breaches, loss of intellectual property, or network downtime.

FIG. 1 shows a pictorial diagram of an example wireless communication network 100. According to some aspects, the wireless communication network 100 can be an example of a wireless local area network (WLAN) such as a Wi-Fi network. For example, the wireless communication network 100 can be a network implementing at least one of the IEEE 802.11 family of wireless communication protocol standards (such as defined by the IEEE 802.11-2020 specification or amendments thereof including, but not limited to, 802.11ay, 802.11ax, 802.11az, 802.11ba, 802.11bd, 802.11be, 802.11bf, and 802.11bn). In some other examples, the wireless communication network 100 can be an example of a cellular radio access network (RAN), such as a 5G or 6G RAN that implements one or more cellular protocols such as those specified in one or more 3GPP standards. In some other examples, the wireless communication network 100 can include a WLAN that functions in an interoperable or converged manner with one or more cellular RANs to provide greater or enhanced network coverage to wireless communication devices within the wireless communication network 100 or to enable such devices to connect to a cellular network's core, such as to access the network management capabilities and functionality offered by the cellular network core.

The wireless communication network 100 may include numerous wireless communication devices including at least one wireless access point (AP) 102 and any number of wireless stations (STAs) 104. While only one AP 102 is shown in FIG. 1, the wireless communication network 100 can include multiple APs 102. The AP 102 can be or represent various different types of network entities including, but not limited to, a home networking AP, an enterprise-level AP, a single-frequency AP, a dual-band simultaneous (DBS) AP, a tri-band simultaneous (TBS) AP, a standalone AP, a non-standalone AP, a software-enabled AP (soft AP), and a multi-link AP (also referred to as an AP multi-link device (MLD)), as well as cellular (such as 3GPP, 4G LTE, 5G or 6G) base stations or other cellular network nodes such as a Node B, an evolved Node B (CNB), a gNB, a transmission reception point (TRP) or another type of device or equipment included in a radio access network (RAN), including Open-RAN (O-RAN) network entities, such as a central unit (CU), a distributed unit (DU) or a radio unit (RU).

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, other handheld or wearable communication devices, netbooks, notebook computers, tablet computers, laptops, Chromebooks, augmented reality (AR), virtual reality (VR), mixed reality (MR) or extended reality (XR) wireless headsets or other peripheral devices, wireless earbuds, other wearable devices, display devices (for example, TVs, computer monitors or video gaming consoles), video game controllers, navigation systems, music or other audio or stereo devices, remote control devices, printers, kitchen appliances (including smart refrigerators) or other household appliances, key fobs (for example, for passive keyless entry and start (PKES) systems), Internet of Things (IoT) devices, and vehicles, among other examples.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the wireless communication network 100. The BSS may be identified by STAs 104 and other devices by a service set identifier (SSID), as well as a basic service set identifier (BSSID), which may be a medium access control (MAC) address of the AP 102. The AP 102 may periodically broadcast beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification or indication of a primary channel used by the respective AP 102 as well as a timing synchronization function (TSF) for establishing or maintaining timing synchronization with the AP 102. The AP 102 may provide access to external networks to various STAs 104 in the wireless communication network 100 via respective communication links 106.

To establish a communication link 106 with an AP 102, each of the STAs 104 is configured to perform passive or active scanning operations ("scans") on frequency channels in one or more frequency bands (for example, the 2.4 GHZ, 5 GHZ, 6 GHZ, 45 GHz, or 60 GHz bands). To perform passive scanning, a STA 104 listens for beacons, which are transmitted by respective APs 102 at periodic time intervals referred to as target beacon transmission times (TBTTs). To perform active scanning, a STA 104 generates and sequentially transmits probe requests on each channel to be scanned and listens for probe responses from APs 102. Each STA 104 may identify, determine, ascertain, or select an AP 102 with which to associate in accordance with the scanning information obtained through the passive or active scans, and to perform authentication and association operations to establish a communication link 106 with the selected AP 102. The selected AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA 104 or to select among multiple APs 102 that together form an extended service set (ESS) including multiple connected BSSs. For example, the wireless communication network 100 may be connected to a wired or wireless distribution system that may enable multiple APs 102 to be connected in such an ESS. As such, a STA 104 can be covered by more than one AP 102 and can associate with different APs 102 at different times for different transmissions. Additionally, after association with an AP 102, a STA 104 also may periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger network such as the wireless communication network 100. In such examples, while the STAs 104 may be capable of communicating with each other through the AP 102 using communication links 106, STAs 104 also can communicate directly with each other via direct wireless communication links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless communication links 110 include Wi-Fi Direct connections, connections established by using a Wi-Fi Tunneled Direct Link Setup (TDLS) link, and other P2P group connections.

In some networks, the AP 102 or the STAs 104, or both, may support applications associated with high throughput or low-latency requirements, or may provide lossless audio to one or more other devices. For example, the AP 102 or the STAs 104 may support applications and use cases associated with ultra-low-latency (ULL), such as ULL gaming, or streaming lossless audio and video to one or more personal audio devices (such as peripheral devices) or AR/VR/MR/XR headset devices. In scenarios in which a user uses two or more peripheral devices, the AP 102 or the STAs 104 may support an extended personal audio network enabling communication with the two or more peripheral devices. Additionally, the AP 102 and STAs 104 may support additional ULL applications such as cloud-based applications (such as VR cloud gaming) that have ULL and high throughput requirements.

As indicated above, in some implementations, the AP 102 and the STAs 104 may function and communicate (via the respective communication links 106) according to one or more of the IEEE 802.11 family of wireless communication protocol standards. These standards define the WLAN radio and baseband protocols for the physical (PHY) and MAC layers. The AP 102 and STAs 104 transmit and receive wireless communications (hereinafter also referred to as "Wi-Fi communications" or "wireless packets") to and from one another in the form of PHY protocol data units (PPDUs).

Each PPDU is a composite structure that includes a PHY preamble and a payload that is in the form of a PHY service data unit (PSDU). The information provided in the preamble may be used by a receiving device to decode the subsequent data in the PSDU. In instances in which a PPDU is transmitted over a bonded or wideband channel, the preamble fields may be duplicated and transmitted in each of multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is associated with the particular IEEE 802.11 wireless communication protocol to be used to transmit the payload.

The APs 102 and STAs 104 in the WLAN 100 may transmit PPDUs over an unlicensed spectrum, which may be a portion of spectrum that includes frequency bands traditionally used by Wi-Fi technology, such as the 2.4 GHZ, 5 GHZ, 6 GHZ, 45 GHZ, and 60 GHz bands. Some examples of the APs 102 and STAs 104 described herein also may communicate in other frequency bands that may support licensed or unlicensed communications. For example, the APs 102 or STAs 104, or both, also may be capable of communicating over licensed operating bands, where multiple operators may have respective licenses to operate in the same or overlapping frequency ranges. Such licensed operating bands may map to or be associated with frequency range designations of FR1 (410 MHZ-7.125 GHZ), FR2 (24.25 GHZ-52.6 GHZ), FR3 (7.125 GHZ-24.25 GHZ), FR4a or FR4-1 (52.6 GHZ-71 GHZ), FR4 (52.6 GHZ-114.25 GHZ), and FR5 (114.25 GHz-300 GHZ).

Each of the frequency bands may include multiple subbands and frequency channels (also referred to as subchannels). For example, PPDUs conforming to the IEEE 802.11n, 802.11ac, 802.11ax, 802.11be and 802.11bn standard amendments may be transmitted over one or more of the 2.4 GHZ, 5 GHZ, or 6 GHZ bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHZ, 80 MHZ, 160 MHZ, 240 MHZ, 320 MHZ, 480 MHz, or 640 MHz by bonding together multiple 20 MHz channels.

Figure 2:
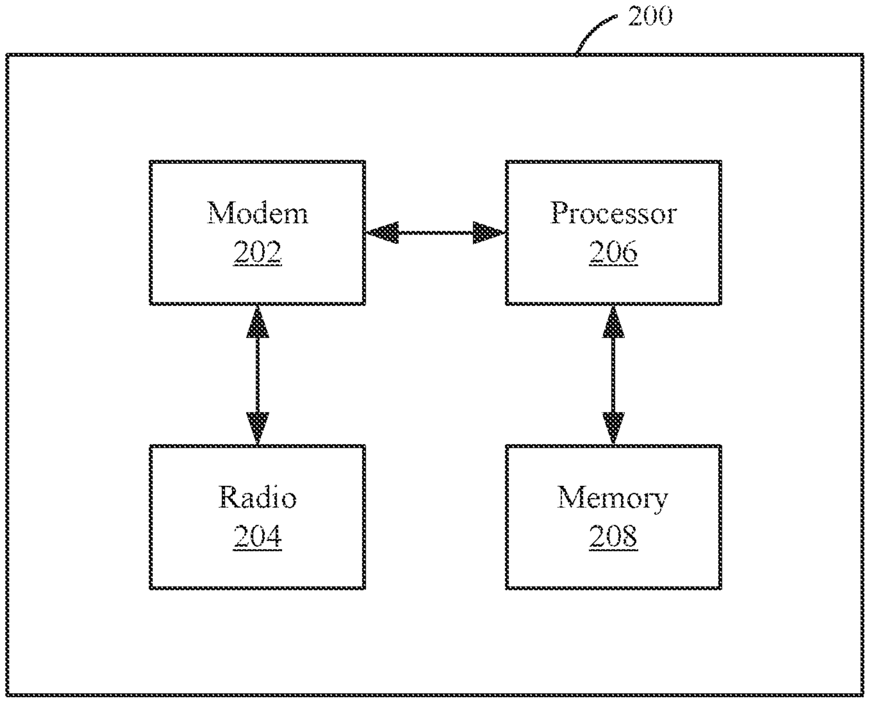
FIG. 2 shows a block diagram of an example wireless communication device that supports security threat notifications.

FIG. 2 shows a block diagram of an example wireless communication device 200 that supports security threat notifications. In some examples, the wireless communication device 200 is configured to perform the process 400 described herein with reference to FIG. 4. In some examples, the wireless communication device 200 is configured to perform the process 500 described herein with reference to FIG. 5.

The wireless communication device 200 may include one or more chips, SoCs, chipsets, packages, components or devices that individually or collectively constitute or comprise a processing system. The processing system may interface with other components of the wireless communication device 200, and may generally process information (such as inputs or signals) received from such other components and output information (such as outputs or signals) to such other components. In some aspects, an example chip may include a processing system, a first interface to output or transmit information and a second interface to receive or obtain information. For example, the first interface may refer to an interface between the processing system of the chip and a transmission component, such that the device 200 may transmit the information output from the chip. In such an example, the second interface may refer to an interface between the processing system of the chip and a reception component, such that the device 200 may receive information that is then passed to the processing system. In some such examples, the first interface also may obtain information, such as from the transmission component, and the second interface also may output information, such as to the reception component.

The processing system of the wireless communication device 200 includes processor (or "processing") circuitry in the form of one or multiple processors, microprocessors, processing units (such as central processing units (CPUs), graphics processing units (GPUs) or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. The processing system may further include memory circuitry in the form of one or more memory devices, memory blocks, memory elements or other discrete gate or transistor logic or circuitry, each of which may include tangible storage media such as random-access memory (RAM) or read-only memory (ROM), or combinations thereof (all of which may be generally referred to herein individually as "memories" or collectively as "the memory" or "the memory circuitry"). One or more of the memories may be coupled with one or more of the processors and may individually or collectively store processor-executable code that, when executed by one or more of the processors, may configure one or more of the processors to perform various functions or operations described herein. Additionally or alternatively, in some examples, one or more of the processors may be preconfigured to perform various functions or operations described herein without requiring configuration by software. The processing system may further include or be coupled with one or more modems (such as a Wi-Fi (for example, IEEE compliant) modem or a cellular (for example, 3GPP 4G LTE, 5G or 6G compliant) modem). In some implementations, one or more processors of the processing system include or implement one or more of the modems. The processing system may further include or be coupled with multiple radios (collectively "the radio"), multiple RF chains or multiple transceivers, each of which may in turn be coupled with one or more of multiple antennas. In some implementations, one or more processors of the processing system include or implement one or more of the radios, RF chains or transceivers.

In some examples, the wireless communication device 200 can be configurable or configured for use in an AP, such as the AP 102 described with reference to FIG. 1. In some other examples, the wireless communication device 200 can be an AP that includes such a processing system and other components including multiple antennas. The wireless communication device 200 is capable of transmitting and receiving wireless communications in the form of, for example, wireless packets. For example, the wireless communication device 200 can be configurable or configured to transmit and receive packets in the form of physical layer PPDUs and MPDUs conforming to one or more of the IEEE 802.11 family of wireless communication protocol standards. In some other examples, the wireless communication device 200 can be configurable or configured to transmit and receive signals and communications conforming to one or more 3GPP specifications including those for 5G NR or 6G. In some examples, the wireless communication device 200 also includes or can be coupled with one or more application processors which may be further coupled with one or more other memories. In some examples, the wireless communication device 200 further includes at least one external network interface coupled with the processing system that enables communication with a core network or backhaul network that enables the wireless communication device 200 to gain access to external networks including the Internet. In some implementations, the wireless communication device 200 can be an example of a device for use in a STA such as one of the STAs 104 described above with reference to FIG. 1. The wireless communication device 200 can be, or can include, a chip, system on chip (SoC), chipset, package, or device that includes one or more modems 202, for example, a Wi-Fi (IEEE 802.11 compliant) modem. In some implementations, the one or more modems 202 (collectively "the modem 202") additionally include a WWAN modem (for example, a 3GPP 4G LTE or 5G compliant modem). In some implementations, the wireless communication device 200 also includes one or more radios 204 (collectively "the radio 204"). In some implementations, the wireless communication device 200 further includes one or more processors, processing blocks or processing elements 206 (collectively "the processor 206"), and one or more memory blocks or elements 208 (collectively "the memory 208").

The modem 202 can include an intelligent hardware block or device such as, for example, an application-specific integrated circuit (ASIC) among other possibilities. The modem 202 is generally configured to implement a PHY layer. For example, the modem 202 is configured to modulate packets and to output the modulated packets to the radio 204 for transmission over the wireless medium. The modem 202 is similarly configured to obtain modulated packets received by the radio 204 and to demodulate the packets to provide demodulated packets. In addition to a modulator and a demodulator, the modem 202 may further include digital signal processing (DSP) circuitry, automatic gain control (AGC), a coder, a decoder, a multiplexer, and a demultiplexer. For example, while in a transmission mode, data obtained from the processor 206 is provided to a coder, which encodes the data to provide encoded bits. The encoded bits are then mapped to points in a modulation constellation (using a selected MCS) to provide modulated symbols. The modulated symbols may then be mapped to a number $N_{SS}$ of spatial streams or a number $N_{STS}$ of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 204. In implementations involving beamforming, the modulated symbols in the respective spatial streams are precoded via a steering matrix prior to their provision to the IFFT block.

While in a reception mode, digital signals received from the radio 204 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 206) for processing, evaluation, or interpretation.

The radio 204 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may in turn be coupled to one or more antennas. For example, in some implementations, the wireless communication device 200 can include, or be coupled with, multiple transmit antennas (each with a corresponding transmit chain) and multiple receive antennas (each with a corresponding receive chain). The symbols output from the modem 202 are provided to the radio 204, which then transmits the symbols via the coupled antennas. Similarly, symbols received via the antennas are obtained by the radio 204, which then provides the symbols to the modem 202.

The processor 206 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 206 processes information received through the radio 204 and the modem 202, and processes information to be output through the modem 202 and the radio 204 for transmission through the wireless medium. For example, the processor 206 may implement a control plane and MAC layer configured to perform various operations related to the generation and transmission of MPDUs, frames, or packets. The MAC layer is configured to perform or facilitate the coding and decoding of frames, spatial multiplexing, space-time block coding (STBC), beamforming, and OFDMA resource allocation, among other operations or techniques. In some implementations, the processor 206 may generally control the modem 202 to cause the modem to perform various operations described here.

The memory 208 can include tangible storage media such as random-access memory (RAM) or read-only memory (ROM), or combinations thereof. The memory 208 also can store non-transitory processor- or computer-executable software (SW) code containing instructions that, when executed by the processor 206, cause the processor to perform various operations described herein for wireless communication, including the generation, transmission, reception, and interpretation of MPDUs, frames or packets. For example, various functions of components disclosed herein, or various blocks or steps of a method, operation, process, or algorithm disclosed herein, can be implemented as one or more modules of one or more computer programs.

Figure 3A:
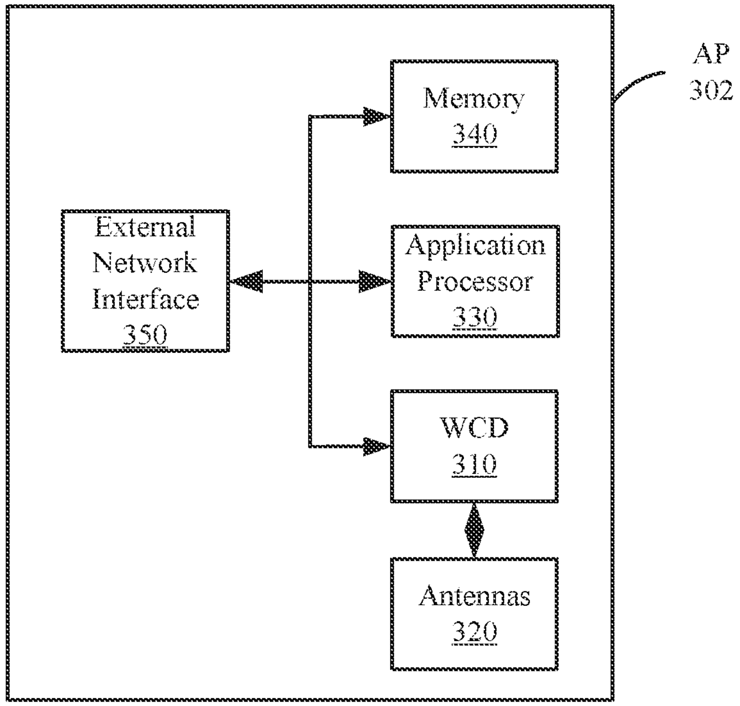
FIG. 3A shows a block diagram of an example access point (AP).

FIG. 3A shows a block diagram of an example AP 302. For example, the AP 302 can be an example implementation of the AP 102 described with reference to FIG. 1. The AP 302 includes a wireless communication device (WCD) 310. For example, the wireless communication device 310 may be an example implementation of the wireless communication device 200 described with reference to FIG. 2. The AP 302 also includes multiple antennas 320 coupled with the wireless communication device 310 to transmit and receive wireless communications. In some implementations, the AP 302 additionally includes an application processor 330 coupled with the wireless communication device 310, and a memory 340 coupled with the application processor 330. The AP 302 further includes at least one external network interface 350 that enables the AP 302 to communicate with a core network or backhaul network to gain access to external networks including the Internet. For example, the external network interface 350 may include one or both of a wired (for example, Ethernet) network interface and a wireless network interface (such as a WWAN interface). Ones of the aforementioned components can communicate with other ones of the components directly or indirectly, over at least one bus. The AP 302 further includes a housing that encompasses the wireless communication device 310, the application processor 330, the memory 340, and at least portions of the antennas 320 and external network interface 350.

Figure 3B:
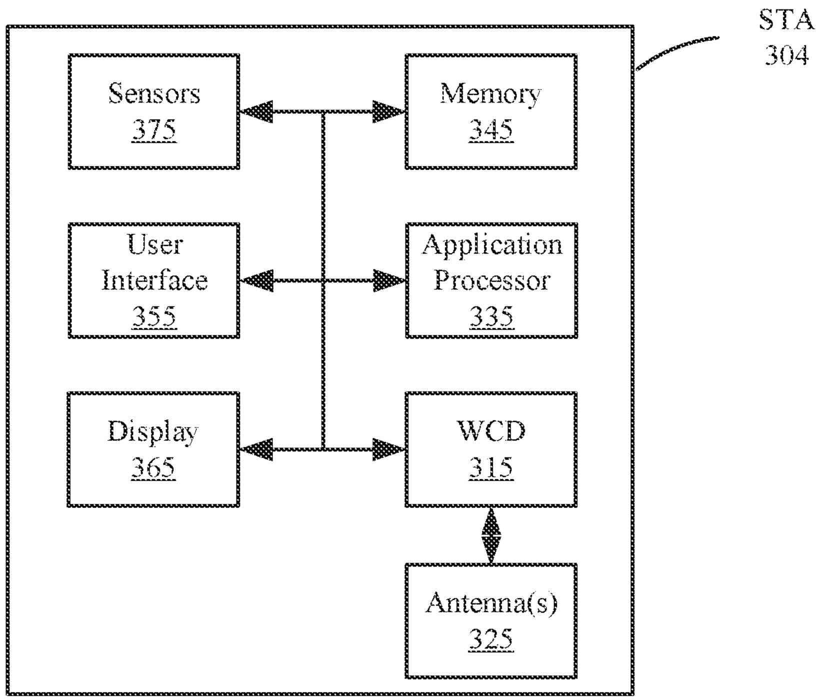
FIG. 3B shows a block diagram of an example station (STA).

FIG. 3B shows a block diagram of an example STA 304. For example, the STA 304 can be an example implementation of the STA 104 described with reference to FIG. 1. The STA 304 includes a wireless communication device 315. For example, the wireless communication device 315 may be an example implementation of the wireless communication device 200 described with reference to FIG. 2. The STA 304 also includes one or more antennas 325 coupled with the wireless communication device 315 to transmit and receive wireless communications. The STA 304 additionally includes an application processor 335 coupled with the wireless communication device 315, and a memory 345 coupled with the application processor 335. In some implementations, the STA 304 further includes a user interface (UI) 355 (such as a touchscreen or keypad) and a display 365, which may be integrated with the UI 355 to form a touchscreen display. In some implementations, the STA 304 may further include one or more sensors 375 such as, for example, one or more inertial sensors, accelerometers, temperature sensors, pressure sensors, or altitude sensors. Ones of the aforementioned components can communicate with other ones of the components directly or indirectly, over at least one bus. The STA 304 further includes a housing that encompasses the wireless communication device 315, the application processor 335, the memory 345, and at least portions of the antennas 325, UI 355, and display 365.

Figure 4:
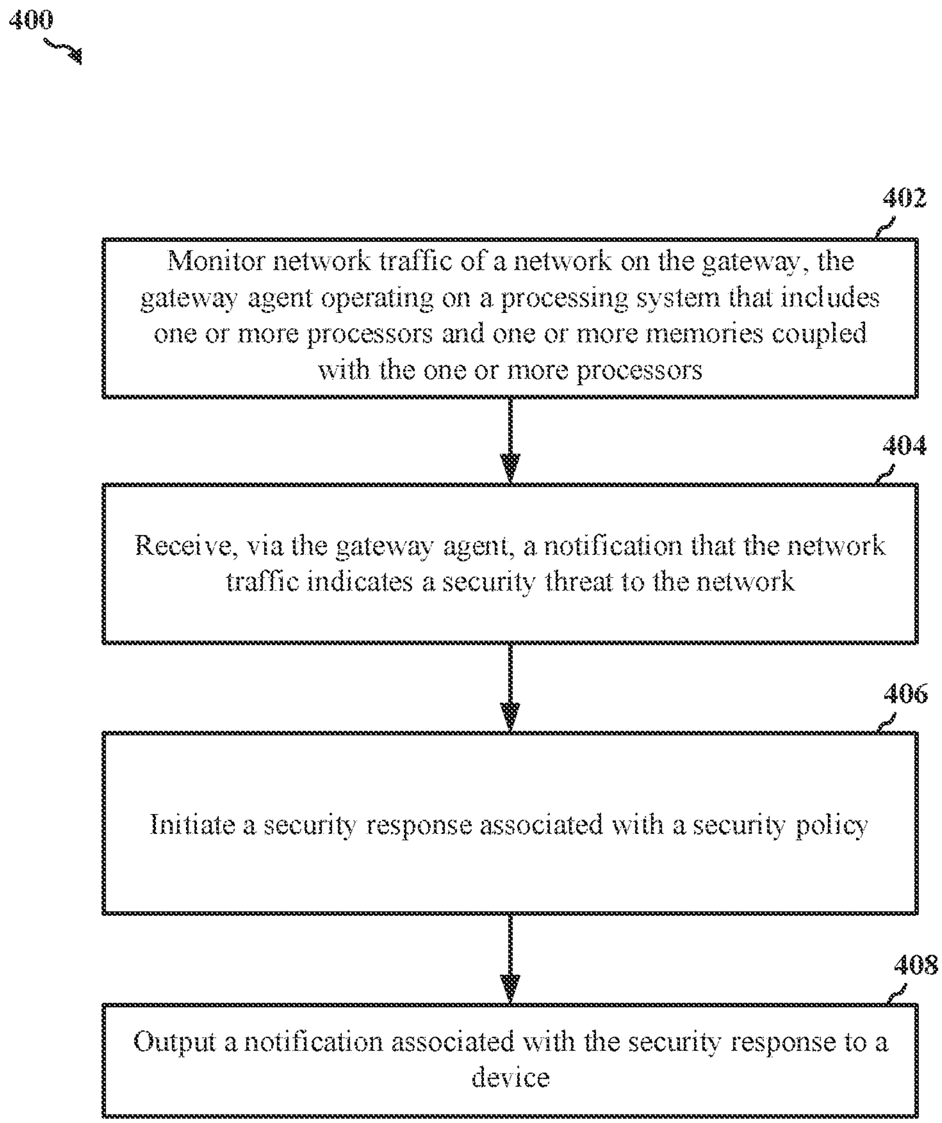
FIG. 4 shows a flowchart illustrating an example process for supporting network security and threat notifications in response to threat detections.

FIG. 4 shows a flowchart illustrating an example process 400 for supporting network security and threat notifications in response to threat detections. The process 400 may be performed by a first wireless communication device such as the wireless communication device 200 described above with reference to FIG. 2. In some implementations, the process 400 may be performed by a wireless communication device operating as or within an AP 102, such as a gateway or router 102 and 302 described above with reference to FIGS. 1 and 3A, respectively.

At block 402, the gateway monitors traffic of a network on the gateway. The gateway may passively monitor the network traffic to classify the network traffic according to the communication protocols that are used by the traffic, and to identify security threats.

At block 404, the gateway receives a notification that the network traffic indicates a security threat to the network. The notification may be associated with one or more of different security attacks, such as a distributed denial-of-service (DDOS) attack, an address resolution protocol (ARP) attack, an internet control message protocol (ICMP) attack, a transmission control protocol (TCP) attack, a user datagram protocol (UDP) volumetric DOS attack, an internet protocol (IP) spoofing attack, and a synchronization packet flood (SYNC) attack, or another security attack. The security attack may be detected by the gateway, such as a gateway agent thereof.

At block 406, the gateway initiates a security response associated with a security policy. In some implementations, the gateway may analyze the security threat using a threat intelligence platform containing a collection of information related to known security threats, select a mitigation procedure for the security threat according to the threat intelligence platform, and include the mitigation procedure with the security response. The mitigation procedure may prevent further activity by the security threat.

At block 408, the gateway outputs a notification associated with the security response to a device.

In some implementations, the security response associated with the notification may cause the gateway to emit a visual indication. In some implementations, the security response associated with the notification may cause the gateway to emit an audio indication. In some implementations, the security response may include an additional notification to a node associated with the gateway and the network causing the node to emit a visual indication. In some implementations, the security response may include a push notification transmitted to an endpoint on the network. In some implementations, the push notification may include a description of the security threat and a mitigation procedure associated with the security threat. In some implementations, the security response may include a notification transmitted to an endpoint on the network and associated with the device. In some implementations, the security response may include transmitting a generated Short Message Service (SMS) message to a mobile device associated with the device. In some implementations, the security response may include transmitting notifications to devices in a device group having unique preferences associated with notifications.

In some implementations, the gateway device may be part of a group of predefined devices defined within the gateway selected to receive the notification. In some implementations, the security response may include inputting network packets associated with the network into a machine learning (ML) model trained to detect attack signatures from contents contained in the network packets, outputting, by the machine learning model, an attack signature indicating a second security threat, selecting a mitigation procedure for the second security threat according to a threat intelligence platform, and in response to outputting the attack signature by the machine learning model, performing a second security response based on the security policy, where the security response includes the mitigation procedure and a second notification to the user in the user group.

Figure 5:
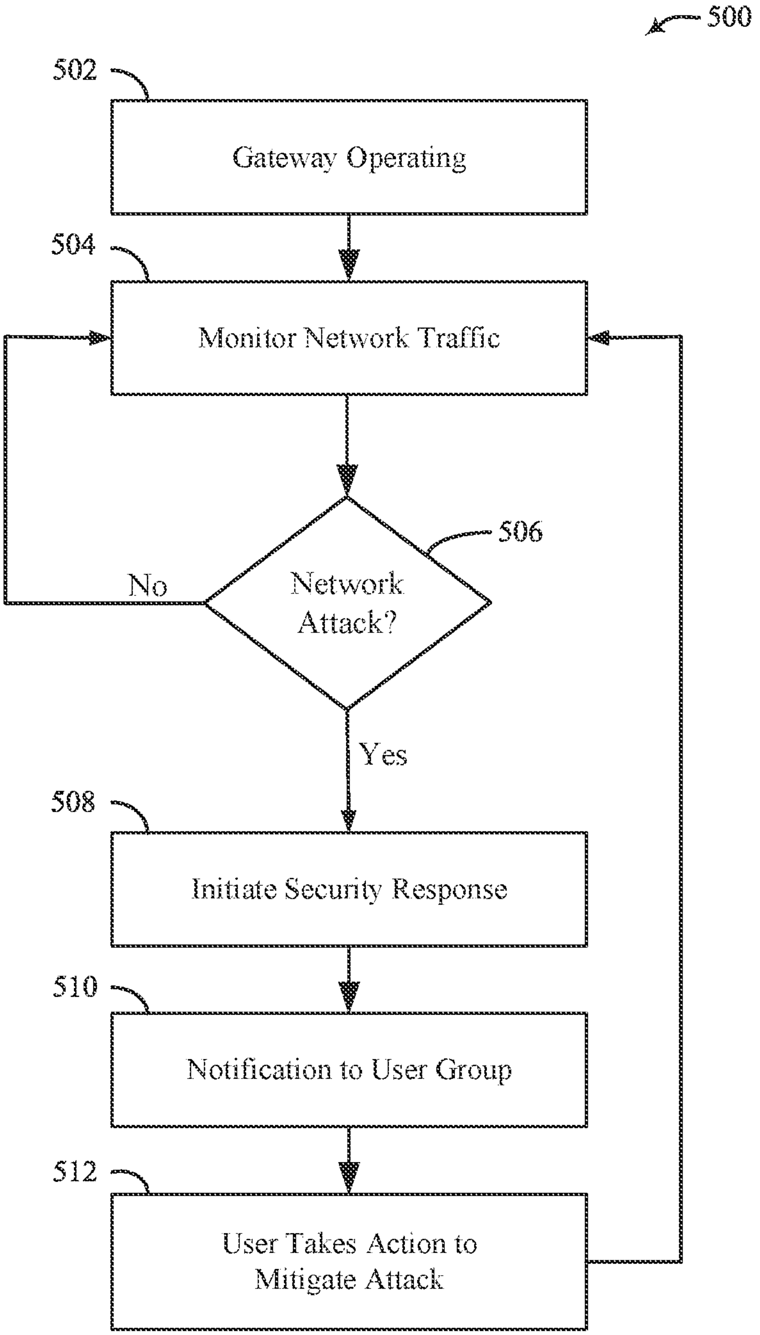
FIG. 5 shows a flowchart illustrating an example process performable by or at a wireless AP that supports network security and threat notifications in response to threat detections.

FIG. 5 shows a flowchart illustrating an example process 500 performable by or at a wireless gateway that supports network security and threat notifications in response to threat detections. The gateway 102 may include one or more processors and one or more memories associated with the processors. The gateway may include the functionality of the AP 102 or another suitable AP.

The gateway may receive and transmit network traffic at block 502. At block 504, the gateway may monitor the network traffic. If a network agent operating on the gateway 102 detects a network attack at block 506, a security response is initiated based on a security policy at block 508, and a notification associated with the security response is sent to one or more network devices 104 at block 510.

Pre-defined notifications may be configured and stored in the gateway memory based on the type of the device 104. For example, push/pop-up notifications may be configured for endpoints such as mobile phones, other handheld or wearable communication devices, netbooks, notebook computers, tablet computers, laptops, Chromebooks, augmented reality (AR), virtual reality (VR), mixed reality (MR) or extended reality (XR) wireless headsets or other peripheral devices, wireless earbuds, other wearable devices, display devices (for example, TVs, computer monitors or video gaming consoles), video game controllers, navigation systems, music or other audio or stereo devices, remote control devices, printers, kitchen appliances (including smart refrigerators) or other household appliances, key fobs (for example, for passive keyless entry and start (PKES) systems), Internet of Things (IoT) devices, and vehicles, among other examples. The push notification may include a description of the security threat and a mitigation procedure associated with the security threat. The security response may cause the endpoint to emit a visual, audio, or tactile indication, or any combination of indications. The notification may be a Short Message Service (SMS) message to a mobile device associated with the gateway or notifications to a group of devices according to notification preferences.

A light also may be activated on the gateway to indicate an ongoing threat, and the gateway may emit an audio signal to notify the user of the attack. Voice activated or controlled devices 104, such as Amazon Alexa, Google Nest, may receive a notification that includes a voice message or a visual indication, such as a blinking light, or both. Based on the notification, the user may take action to mitigate the attack at block 512.

Figure 6:
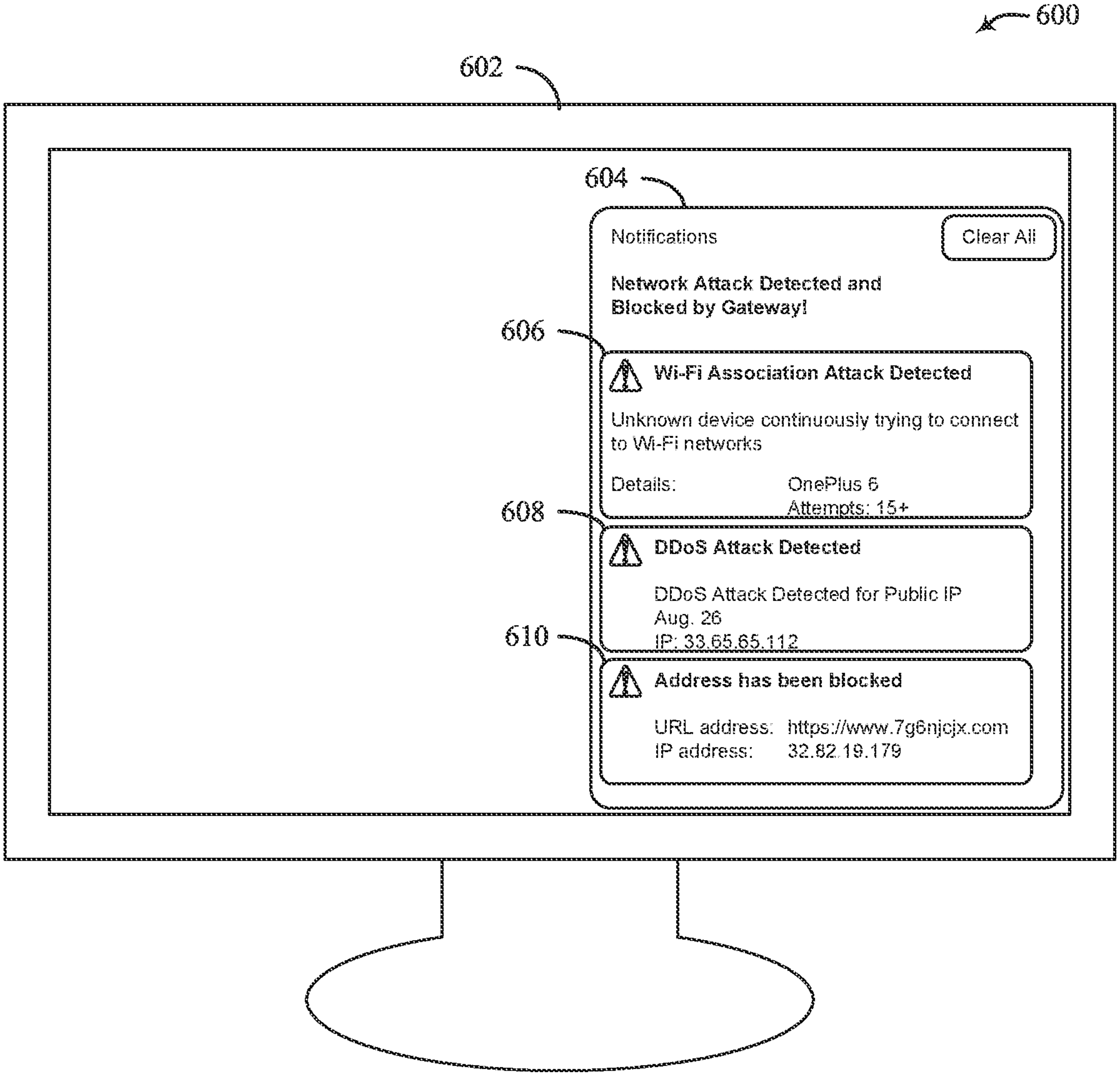
FIG. 6 shows a pictorial diagram of an example computer and monitor that supports network attack notification.

FIG. 6 shows a pictorial diagram of an example computer and monitor 600 that supports network attack notification. The computer and monitor 600 may be an STA wirelessly connected to the gateway 102. The computer and monitor 600 may include a display 602 on which notifications 604 may be displayed. If the network agent operating on the gateway 102 detects a network attack, a security response is initiated based on a security policy, and a notification associated with the security response is sent to the computer and displayed on the display 602. Examples of messages that may be displayed include notifications apprising the administrator/user of a Wi-Fi Association Attack (notification 606) or a DDOS Attack (notification 608). Other informational notifications may be displayed such as a message that an IP address has been blocked (notification 610).

Figure 7:
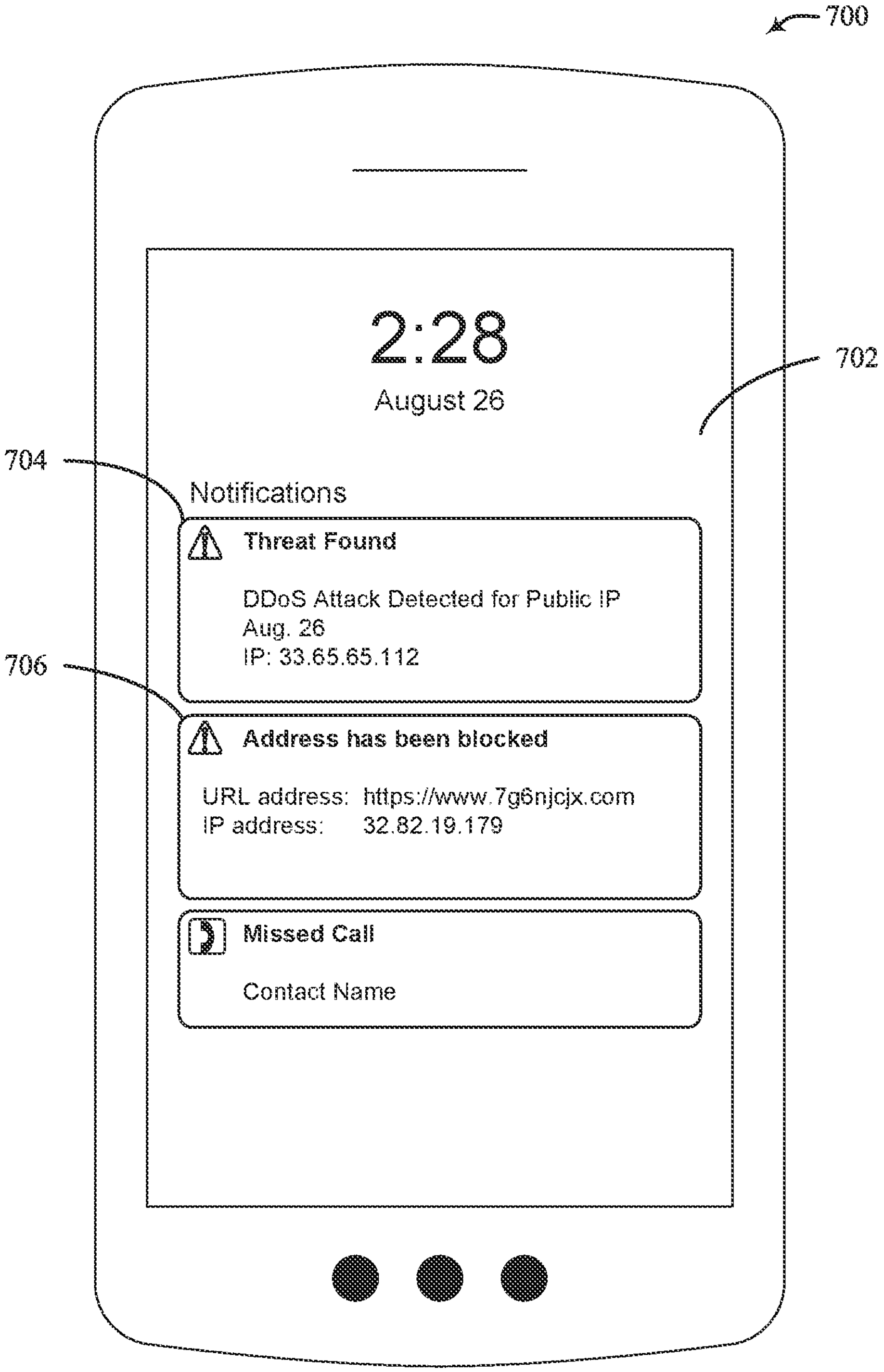
FIG. 7 shows a pictorial diagram of an example wireless STA that supports network attack notification.

FIG. 7 shows a pictorial diagram of an example wireless STA that supports network attack notification. The wireless STA depicted in FIG. 7 may be an example of a mobile phone 700 that supports network attack notification. The mobile phone 700 includes a screen 702 on which notifications may be displayed. If the network agent operating on the gateway 102 detects a network attack, a security response may be initiated based on a security policy, and a notification associated with the security response may be sent to the mobile phone 700 and displayed on the screen 702. Examples of messages that may be displayed include a message 704 indicating a DdoS Attack. Other informational notifications may be displayed such as a message 706 indicating that an IP address has been blocked. The security response may cause the mobile phone 700 to also emit an audio or tactile indication. The notification may be a SMS message to the mobile phone 700 associated with the gateway 102.

Figure 8:
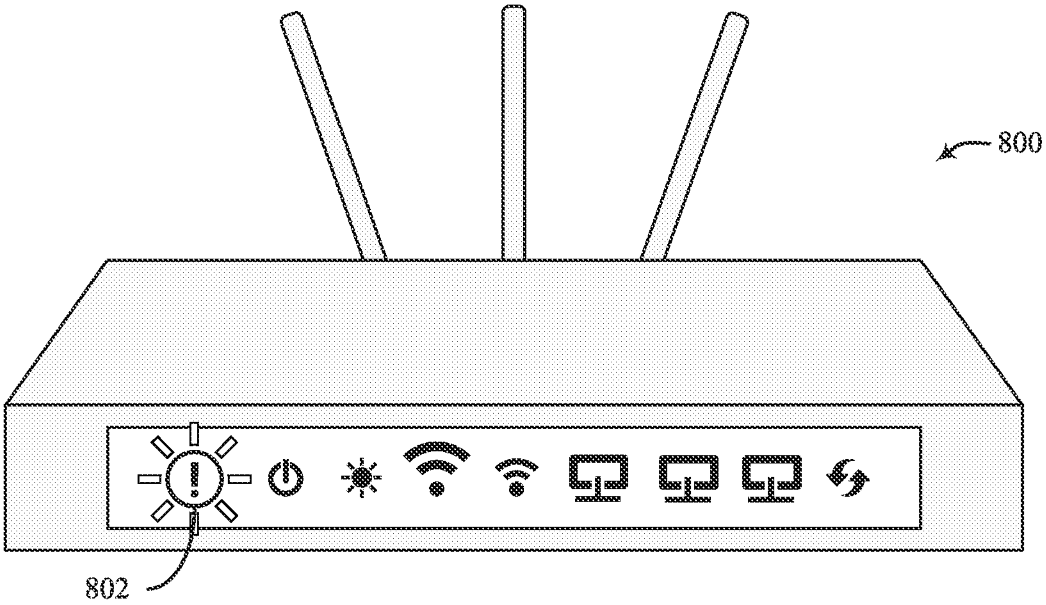
FIG. 8 shows a pictorial diagram of an example gateway device that supports network security and threat notifications in response to threat detections.

FIG. 8 shows a pictorial diagram of an example gateway device that supports network security and threat notifications in response to threat detections. The gateway device depicted in FIG. 11 may be an AP and an example of a router 800 that supports network security and threat notifications in response to threat detections. If the network agent operating on the router 800 detects a network attack, a security response may be initiated based on a security policy, and a notification associated with the security response may be sent to the connected STAs 104. A warning light 802 may be illuminated to indicate a network attack. The warning light 802 may be a steady light or may flash to draw attention to the network attack. In some examples, the warning light 802 may flash in different colors to indicate different types of attacks. In some examples, an audible alert may alternately or additionally be generated.

Figure 9:
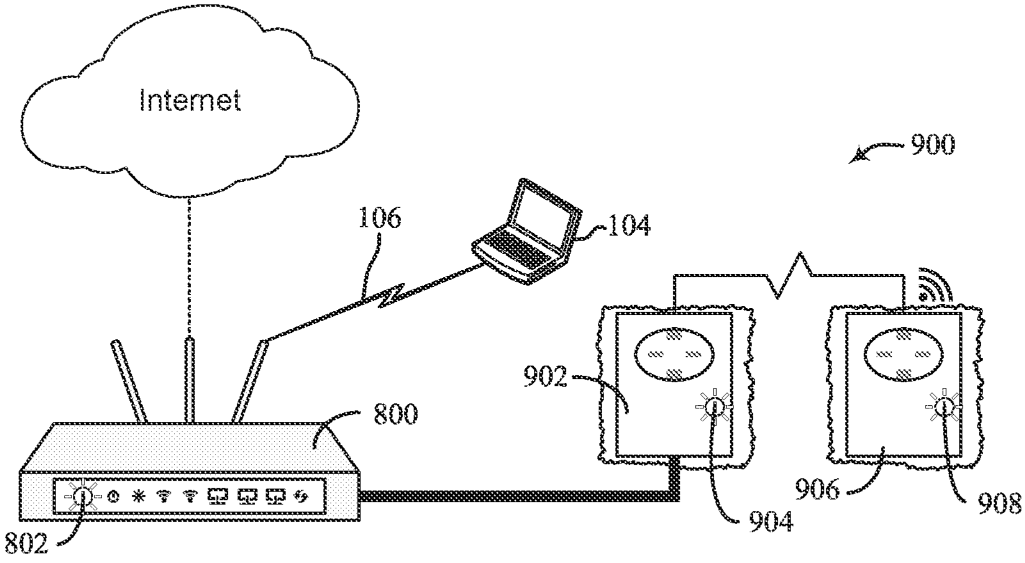
FIG. 9 shows a pictorial diagram of an example gateway device that supports network security and threat notifications in response to threat detections, and wireless powerline adapters that support network attack notification.

FIG. 9 shows a pictorial diagram of an example gateway device that supports network security and threat notifications in response to threat detections, and wireless powerline adapters that support network attack notification. The gateway device depicted in FIG. 6 may be an AP and an example of the router 800 that supports network security and threat notifications in response to threat detections, and wireless powerline adapters 900 that support network attack notification. The one or more wireless powerline adapters 902 and 906 may provide power to the router 800 and other devices connected to the wireless powerline adapters 902 and 906. If the network agent operating on the router 800 detects a network attack, a security response may be initiated based on a security policy, and a notification 604 associated with the security response may be sent to the connected STAs 104, including the wireless powerline adapters 902 and 906. A warning light 904 and 908 of the wireless powerline adapters 902 and 906, respectively, may be illuminated to indicate a network attack. The warning lights 902 and 906 may be steady lights or flashing to draw attention to the network attack. In some examples, the warning light 902 and 906 may flash in different colors to indicate different types of attacks.

Figure 10:
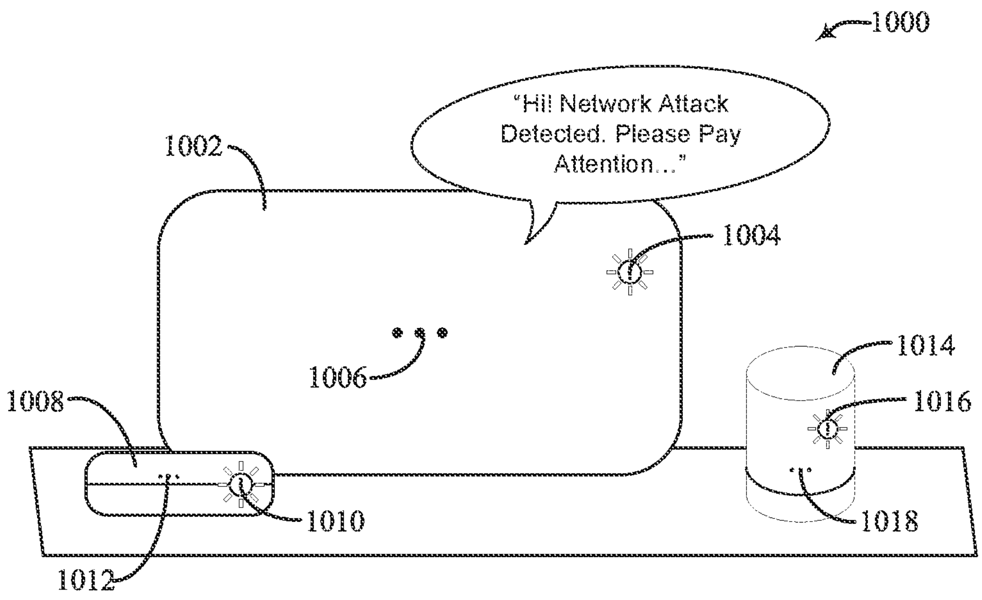
FIG. 10 shows a pictorial diagram of an example of a wireless STA that supports network attack notification.

FIG. 10 shows a pictorial diagram of an example of a wireless STA that supports network attack notification. The device depicted in FIG. 10 may be an STA and an example of wireless voice activated devices 1000 that support network attack notification. In the illustrated example, a Google Nest (or another suitable) device 1002 connected to the gateway 102 may include a warning light 1004 or other lights 1006 that are illuminated in response to a notification associated with detection of a network attack. The Google Nest 1002 also may provide audio messages provided by the notification associated with the security response. A Google Nest Mini 1008 connected to the gateway 102 may include a warning light 1010 or other lights 1012 that are illuminated in response to a notification associated with detection of a network attack. The Google Nest Mini 1008 also may provide audio messages provided by the notification associated with the security response. An Amazon Alexa 1014 connected to the gateway 102 may include a warning light 1016 or other lights 1018 that are illuminated in response to a notification associated with detection of a network attack. The Amazon Alexa 1014 also may provide audio messages provided by the notification associated with the security response.

Figure 11:
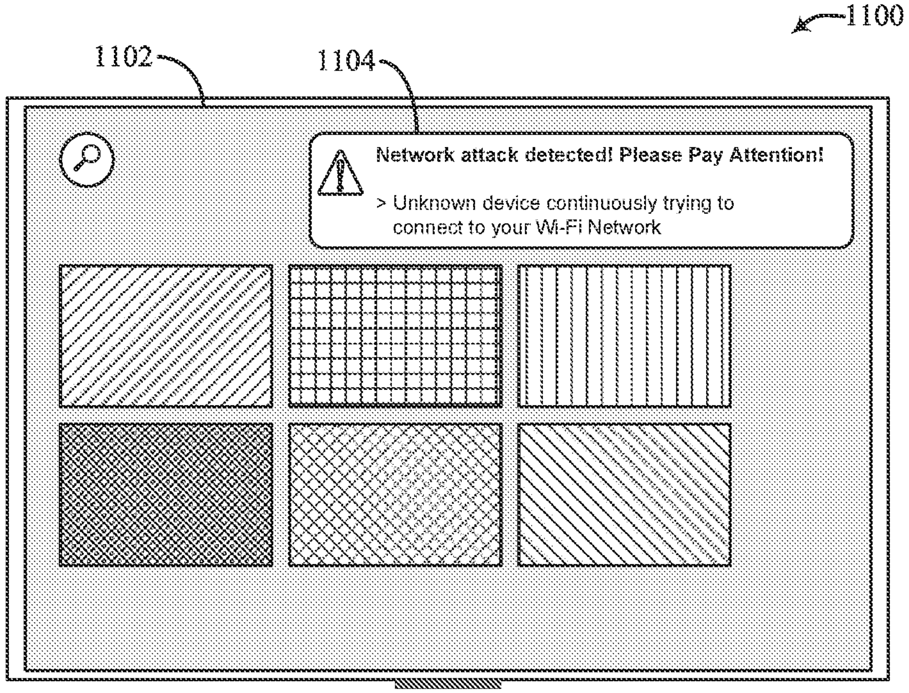
FIG. 11 shows a pictorial diagram of an example wireless STA that supports network attack notification.

FIG. 11 shows a pictorial diagram of an example wireless STA that supports network attack notification. The device depicted in FIG. 11 may be an STA and an example of a television 1100 that supports network attack notification. The television 1100 is wirelessly connected to the gateway 102. The television 1100 includes a screen 1102 on which notifications 1104 may be displayed. If the network agent operating on the gateway 102 detects a network attack, a security response may be initiated based on a security policy, and a notification associated with the security response may be displayed on the television screen 1102. Examples of a message that may be displayed include a network attack notification 1104.

The security response may include a threat intelligence platform that is trained and updated with attacking signatures which helps machine learning (ML) algorithms to dissect and classify the packets based on their contents. The ML model may output an attack signature indicating a security threat and select a mitigation procedure for the security threat according to a threat intelligence platform. In response to outputting the attack signature by the threat intelligence platform, a second security response may be performed based on the security policy, which may include the mitigation procedure and a second notification to the user in the user group. If the threat intelligence platform detects it has malformed or bad packets, it can notify the user and download security patches to enhance the security. The threat intelligence platform also may suggest that passwords or SSIDs be changed periodically, block IP addresses or website URLs, or disable remote management options based on the type of network attacks encountered.

Network attack notification can give a user early warning of an attack before it reaches its full intensity. This early warning can allow the user to act and mitigate the impact of the attack. By providing a network attack notification, a user can quickly respond to the attack and begin implementing mitigation strategies to prevent the attack from causing damage, and reduce the amount of time its systems and services are unavailable, minimizing the impact on customers and revenue. Network attack notifications also can provide greater visibility into network activity to help better understand network vulnerabilities and improve the overall security posture.

Implementation examples are described in the following numbered clauses:

1. A gateway device, including:
a processing system that includes one or more processors and one or more memories coupled with the one or more processors, the processing system configured to cause the gateway to:
monitor network traffic of a network on the gateway;
receive a notification that the network traffic indicates a security threat to the network;
initiate a security response associated with a security policy; and
output the notification associated with the security response to a device.
2. The gateway device of clause 1, where the processing system is further configured to cause the gateway to:
analyze the security threat using a threat intelligence platform containing a collection of information related to known security threats;
select a mitigation procedure for the security threat according to the threat intelligence platform; and
include the mitigation procedure with the security response, where the mitigation procedure prevents further activity by the security threat.
3. The gateway device of any of clauses 1 or 2, where the security response causes the gateway to emit a visual indication.
4. The gateway device of any of clauses 1, 2, or 3, where the security response causes the gateway to emit a audio indication.
5. The gateway device of any of clauses 1, 2, 3, or 4, where the security response includes an additional notification to a node associated with the gateway and the network causing the node to emit a visual indication.
6. The gateway device of any of clauses 1, 2, 3, 4, or 5, where the security response includes a push notification transmitted to an endpoint on the network, where the endpoint is associated with the device.
7. The gateway device of any of clauses 1, 2, 3, 4, 5, or 6, where the push notification includes a description of the security threat and a mitigation procedure associated with the security threat.
8. The gateway device of any of clauses 1, 2, 3, 4, 5, 6, or 7, where the security response includes a notification transmitted to an endpoint on the network and associated with the device, where the notification causes the endpoint to emit a visual indication.
9. The gateway device of any of clauses 1, 2, 3, 4, 5, 6, 7, or 8, where the security response includes transmitting a generated Short Message Service (SMS) message to a mobile device associated with the device.
10. The gateway device of any of clauses 1, 2, 3, 4, 5, 6, 7, 8, or 9, where the security response transmits notifications to devices in a device group associated with the device, where each device in the device group includes notification preferences.
11. The gateway device of any of clauses 1, 2, 3, 4, 5, 6, 7, 8, 9, or 10, where the device is part of a group of predefined devices defined within the gateway selected to receive the notification.
12. The gateway device of any of clauses 1, 2, 3, 4, 5, 6, 7, 8, 9, 10, or 11, where the processing system is further configured to cause the gateway to select a mitigation procedure for one or more security threats according to a threat intelligence platform.

13. The gateway device of any of clauses 1, 2, 3, 4, 5, 6, 7, 8, 9, 10, 11, or 12, wherein the threat intelligence platform is trained and updated using attacking signatures associated with one or more security threats, 14. A method of operation of a gateway, including:
monitoring network traffic of a network on the gateway;
receiving a notification that the network traffic indicates a security threat to the network;
initiating a security response associated with a security policy; and
outputting the notification associated with the security response to a device.

15. The method of clause 14, further including the steps of:
analyzing the security threat using a threat intelligence platform containing a collection of information related to known security threats;
selecting a mitigation procedure for the security threat according to the threat intelligence platform; and
including the mitigation procedure with the security response, where the mitigation procedure prevents further activity by the security threat.

16. The method of any of clauses 14 or 15, where the security response causes the gateway to emit a visual indication.

17. The method of any of clauses 14, 15, or 16, where the security response causes the gateway to emit a audio indication.

18. The method of any of clauses 14, 15, 16, or 17, where the security response includes an additional notification to a node associated with the gateway and the network causing the node to emit a visual indication.

19. The method of any of clauses 14, 15, 16, 17, or 18, where the security response includes a push notification transmitted to an endpoint on the network, where the endpoint is associated with the device.

20. The method of any of clauses 14, 15, 16, 17, 18, or, 19, where the push notification includes a description of the security threat and a mitigation procedure associated with the security threat.

21. The method of any of clauses 14, 15, 16, 17, 18, 19, or 20, where the security response includes a notification transmitted to an endpoint on the network and associated with the device, where the notification causes the endpoint to emit a visual indication.

22. The method of any of clauses 14, 15, 16, 17, 18, 19, 20, or 21, where the security response includes transmitting a generated Short Message Service (SMS) message to a mobile device associated with the device.

23. The method of any of clauses 14, 15, 16, 17, 18, 19, 20, 21, or 22, where the security response includes transmitting notifications to devices in a device group associated with the device, where each device in the device group includes notification preferences.

24. The method of any of clauses 14, 15, 16, 17, 18, 19, 20, 21, 22, or 23, where the gateway device is part of a group of predefined devices defined within the gateway selected to receive the notification.

25. The method of any of clauses 14, 15, 16, 17, 18, 19, 20, 21, 22, 23, or 24, further including the steps of:
inputting network packets associated with the network into a machine learning (ML) model trained to detect attack signatures from contents contained in the network packets;
outputting, by the machine learning model, an attack signature indicating a second security threat;
selecting a mitigation procedure for the second security threat according to a threat intelligence platform; and
in response to outputting the attack signature by the machine learning model, performing a second security response based on the security policy, where the security response includes the mitigation procedure and a second notification to the user in the user group.

26. A gateway device, including:
a processing system that includes processor circuitry and memory circuitry that stores code, the processing system configured to cause the gateway to:
monitor network traffic of a network on the gateway;
receive a notification that the network traffic indicates a security threat to the network;
initiate a security response associated with a security policy; and
output the notification associated with the security response to a device;
where the notification includes a description of the security threat and a mitigation procedure associated with the security threat.

27. The gateway device of clause 26, where the processing system is further configured to cause the gateway to:
analyze the security threat using a threat intelligence platform containing a collection of information related to known security threats;
select a mitigation procedure for the security threat according to the threat intelligence platform; and
include the mitigation procedure with the security response, where the mitigation procedure prevents further activity by the security threat.

28. The gateway device of any of clauses 26 or 27, where the security response causes the gateway to emit a visual indication.

29. The gateway device of any of clauses 26, 27, or 28, where the security response causes the gateway to emit a audio indication.

30. The gateway device of any of clauses 26, 27, 28, or 29, where the security response includes an additional notification to a node associated with the gateway and the network causing the node to emit a visual indication.

31. The gateway device of any of clauses 26, 27, 28, 29, or 30, where the security response includes a push notification transmitted to an endpoint on the network, where the endpoint is associated with the device.

32. The gateway device of any of clauses 26, 27, 28, 29, 30, or 31, where the security response includes a notification transmitted to an endpoint on the network and associated with the device, where the notification causes the endpoint to emit a visual indication.

33. The gateway device of any of clauses 26, 27, 28, 29, 30, 31, or 32, where the security response includes transmitting a generated Short Message Service (SMS) message to a mobile device associated with the device.

34. The gateway device of any of clauses 26, 27, 28, 29, 30, 31, 32, or 33, where the security response transmits notifications to devices in a device group associated with the device, where each device in the device group includes notification preferences.

35. The gateway device of any of clauses 26, 27, 28, 29, 30, 31, 32, 33, or 34, where the device is part of a group of predefined devices defined within the gateway selected to receive the notification.

36. The gateway device of any of clauses 26, 27, 28, 29, 30, 31, 32, 33, 34, 35, or 36, where the processing system is further configured to cause the gateway to:

input network packets associated with the network into a machine learning (ML) model trained to detect attack signatures from contents contained in the network packets;

output, by the machine learning model, an attack signature indicating a second security threat;

select a mitigation procedure for the second security threat according to a threat intelligence platform; and in response to outputting the attack signature by the machine learning model, perform a second security response based on the security policy, where the security response includes the mitigation procedure and a second notification to the user in the user group.

37. A method of operation of gateway device, including the steps of:

monitoring network traffic of a network on the gateway;

receiving a notification that the network traffic indicates a security threat to the network;

initiating a security response associated with a security policy; and outputting the notification associated with the security response to a device;

where the notification includes a description of the security threat and a mitigation procedure associated with the security threat.

38. The method of clause 37, further including the steps of:

analyzing the security threat using a threat intelligence platform containing a collection of information related to known security threats;

selecting a mitigation procedure for the security threat according to the threat intelligence platform; and including the mitigation procedure with the security response, where the mitigation procedure prevents further activity by the security threat.

39. The method of any of clauses 37 or 38, where the security response causes the gateway to emit a visual indication.

40. The method of any of clauses 37, 38, or 39, where the security response causes the gateway to emit a audio indication.

41. The method of any of clauses 37, 38, 39, or 40, where the security response includes an additional notification to a node associated with the gateway and the network causing the node to emit a visual indication.

As used herein, the term “determine” or “determining” encompasses a wide variety of actions and, therefore, “determining” can include calculating, computing, processing, deriving, estimating, investigating, looking up (such as via looking up in a table, a database, or another data structure), inferring, ascertaining, or measuring, among other possibilities. Also, “determining” can include receiving (such as receiving information), accessing (such as accessing data stored in memory) or transmitting (such as transmitting information), among other possibilities. Additionally, “determining” can include resolving, selecting, obtaining, choosing, establishing and other such similar actions.

As used herein, a phrase referring to “at least one of” or “one or more of” a list of items refers to any combination of those items, including single members. As an example, “at least one of: a, b, or c” is intended to cover: a, b, c, a-b, a-c, b-c, and a-b-c. As used herein, “or” is intended to be interpreted in the inclusive sense, unless otherwise explicitly indicated. For example, “a or b” may include a only, b only, or a combination of a and b. Furthermore, as used herein, a phrase referring to “a” or “an” element refers to one or more of such elements acting individually or collectively to perform the recited function(s). Additionally, a “set” refers to one or more items, and a “subset” refers to less than a whole set, but non-empty.

As used herein, “based on” is intended to be interpreted in the inclusive sense, unless otherwise explicitly indicated. For example, “based on” may be used interchangeably with “based at least in part on,” “associated with,” “in association with,” or “in accordance with” unless otherwise explicitly indicated. Specifically, unless a phrase refers to “based on only ‘a,’” or the equivalent in context, whatever it is that is “based on ‘a,’” or “based at least in part on ‘a,’” may be based on “a” alone or based on a combination of “a” and one or more other factors, conditions, or information.

The various illustrative components, logic, logical blocks, modules, circuits, operations, and algorithm processes described in connection with the examples disclosed herein may be implemented as electronic hardware, firmware, software, or combinations of hardware, firmware, or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the examples described in this disclosure may be readily apparent to persons having ordinary skill in the art, and the generic principles defined herein may be applied to other examples without departing from the spirit or scope of this disclosure. Thus, the claims are not intended to be limited to the examples shown herein, but are to be accorded the widest scope consistent with this disclosure, the principles and the novel features disclosed herein.

Additionally, various features that are described in this specification in the context of separate examples also can be implemented in combination in a single implementation. Conversely, various features that are described in the context of a single implementation also can be implemented in multiple examples separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

What is claimed is:

1. A gateway device, comprising:

a processing system that includes one or more processors and one or more memories coupled with the one or more processors, the processing system configured to cause the gateway to:

monitor network traffic of a network on the gateway to identify a security threat;

receive a notification that the network traffic indicates the security threat to the network, the notification identifying an IP address associated with the security threat;

analyze the security threat using a threat intelligence platform containing a collection of information related to known security threats;

select a mitigation procedure for the security threat according to the threat intelligence platform;

initiate a security response associated with a security policy, the security response being scoped to traffic associated with the identified IP address by applying the security policy to network traffic having the identified IP address as a source address and a destination address, the security response including the mitigation procedure, wherein the mitigation procedure prevents further activity by the security threat by blocking the identified IP address; and output the notification associated with the security response to a device.

2. The gateway device of claim 1, wherein the processing system is further configured to cause the gateway device to:

analyze the security threat using a threat intelligence platform containing a collection of information related to known security threats;

select a mitigation procedure for the security threat according to the threat intelligence platform; and include the mitigation procedure with the security response, wherein the mitigation procedure prevents further activity by the security threat.

3. The gateway device of claim 1, wherein the security response causes the gateway device to emit a visual indication.

4. The gateway device of claim 1, wherein the security response causes the gateway device to emit a audio indication.

5. The gateway device of claim 1, wherein the security response includes an additional notification to a node associated with the gateway device and the network causing the node to emit a visual indication.

6. The gateway device of claim 1, wherein the security response includes a push notification transmitted to an endpoint on the network, wherein the endpoint is associated with the device.

7. The gateway device of claim 6, wherein the push notification includes a description of the security threat and a mitigation procedure associated with the security threat.

8. The gateway device of claim 1, wherein the security response includes a notification transmitted to an endpoint on the network and associated with the device, wherein the notification causes the endpoint to emit a visual indication.

9. The gateway device of claim 1, wherein the security response includes transmitting a generated Short Message Service (SMS) message to a mobile device associated with the device.

10. The gateway device of claim 1, wherein the security response transmits notifications to devices in a device group associated with the device, wherein each device in the device group includes notification preferences.

11. The gateway device of claim 1, wherein the device is part of a group of predefined devices defined within the gateway device selected to receive the notification.

12. The gateway device of claim 1, wherein the processing system is further configured to cause the gateway device to select a mitigation procedure for one or more security threats according to a threat intelligence platform.

13. The gateway device of claim 12, wherein the threat intelligence platform is trained and updated using attacking signatures associated with the one or more security threats.

14. A method of operation of a gateway, comprising:

monitoring network traffic of a network on the gateway to identify a security threat;

receiving a notification that the network traffic indicates the security threat to the network, the notification identifies an IP address associated with the security threat;

analyzing the security threat using a threat intelligence platform containing a collection of information related to known security threats;

selecting a mitigation procedure for the security threat according to the threat intelligence platform;

initiating a security response associated with a security policy, the security response being scoped to traffic associated with the identified IP address by applying the security policy to network traffic having the identified IP address as a source address and a destination address, the security response including the mitigation procedure, wherein the mitigation procedure prevents further activity by the security threat by blocking the identified IP address; and outputting the notification associated with the security response to a device.

15. The method of claim 14, further comprising:

analyzing the security threat using a threat intelligence platform containing a collection of information related to known security threats;

selecting a mitigation procedure for the security threat according to the threat intelligence platform; and including the mitigation procedure with the security response, wherein the mitigation procedure prevents further activity by the security threat.

16. The method of claim 14, wherein the security response causes the gateway to emit a visual indication.

17. The method of claim 14, wherein the security response causes the gateway to emit a audio indication.

18. The method of claim 14, wherein the security response includes an additional notification to a node associated with the gateway and the network causing the node to emit a visual indication.

19. The method of claim 14, wherein the security response includes a push notification transmitted to an endpoint on the network, wherein the endpoint is associated with the device.

20. The method of claim 19, wherein the push notification includes a description of the security threat and a mitigation procedure associated with the security threat.

21. The method of claim 14, wherein the security response includes a notification transmitted to an endpoint on the network and associated with the device, wherein the notification causes the endpoint to emit a visual indication.

22. The method of claim 14, wherein the security response includes transmitting a generated Short Message Service (SMS) message to a mobile device associated with the device.

23. The method of claim 14, wherein the security response includes transmitting notifications to devices in a device group associated with the device, wherein each device in the device group includes notification preferences.

24. The method of claim 14, wherein the gateway device is part of a group of predefined devices defined within the gateway selected to receive the notification.

25. The method of claim 14, further comprising:

inputting network packets associated with the network into a machine learning (ML) model trained to detect attack signatures from contents contained in the network packets;

outputting, by the machine learning model, an attack signature indicating a second security threat;

selecting a mitigation procedure for the second security threat according to a threat intelligence platform; and in response to outputting the attack signature by the machine learning model, performing a second security response based on the security policy, wherein the security response includes the mitigation procedure and a second notification.

26. A gateway device, comprising:

a processing system that includes processor circuitry and memory circuitry that stores code, the processing system configured to cause the gateway device to:

monitor network traffic of a network on the gateway device to identify a security threat;

receive a notification that the network traffic indicates the security threat to the network, the notification identifying an IP address associated with the security threat;

analyze the security threat using a threat intelligence platform containing a collection of information related to known security threats;

select a mitigation procedure for the security threat according to the threat intelligence platform;

initiate a security response associated with a security policy, the security response being scoped to traffic associated with the identified IP address by applying the security policy to network traffic having the identified IP address as a source address and a destination address, the security response including the mitigation procedure, wherein the mitigation procedure prevents further activity by the security threat by blocking the identified IP address; and output the notification associated with the security response to a device;

wherein the notification includes a description of the security threat and a mitigation procedure associated with the security threat.

27. The gateway device of claim 26, wherein the processing system is further configured to cause the gateway device to:

analyze the security threat using a threat intelligence platform containing a collection of information related to known security threats;

select a mitigation procedure for the security threat according to the threat intelligence platform; and include the mitigation procedure with the security response, wherein the mitigation procedure prevents further activity by the security threat.

28. The gateway device of claim 26, wherein the security response causes the gateway device to emit a visual indication.

29. The gateway device of claim 26, wherein the security response causes the gateway device to emit a audio indication.

30. The gateway device of claim 26, wherein the security response includes a notification transmitted to an endpoint on the network and associated with the device, wherein the notification causes the endpoint to emit a visual indication.

* * * * *